(12) United States Patent
Zhang et al.

(10) Patent No.: US 12,406,391 B2
(45) Date of Patent: Sep. 2, 2025

(54) CONTEXTUAL INSTANCE DECOUPLING-BASED MULTI-PERSON POSE ESTIMATION METHOD AND APPARATUS

(71) Applicant: Peking University, Beijing (CN)

(72) Inventors: Shiliang Zhang, Beijing (CN); Dongkai Wang, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 363 days.

(21) Appl. No.: 18/088,981

(22) Filed: Dec. 27, 2022

(65) Prior Publication Data

US 2023/0360256 A1 Nov. 9, 2023

(30) Foreign Application Priority Data

Apr. 1, 2022 (CN) .......................... 202210339901.8

(51) Int. Cl.
*G06T 7/73* (2017.01)

(52) U.S. Cl.
CPC ...... *G06T 7/73* (2017.01); *G06T 2207/20076* (2013.01); *G06T 2207/20081* (2013.01); *G06T 2207/30196* (2013.01)

(58) Field of Classification Search
CPC ............. G06T 7/73; G06T 2207/20076; G06T 2207/20081; G06T 2207/30196; G06T 2207/20084; G06V 40/20; G06V 10/42; G06V 10/768

USPC ........................................................ 382/103
See application file for complete search history.

(56) References Cited

U.S. PATENT DOCUMENTS

| 11,625,838 B1 * | 4/2023 | Narapureddy ....... G06V 10/454 |
| | | 382/103 |
| 2022/0129689 A1 * | 4/2022 | Kim ........................ G06V 10/82 |

FOREIGN PATENT DOCUMENTS

| CN | 111738091 | * | 10/2020 | ............ G06V 40/103 |
| CN | 110135375 | * | 6/2021 | .............. G06N 3/045 |
| WO | WO2022143314 | * | 7/2022 | .............. G06N 3/045 |
| WO | WO2023288262 | * | 1/2023 | ............... G06T 7/55 |

* cited by examiner

*Primary Examiner* — Jerome Grant, II
(74) *Attorney, Agent, or Firm* — Scully, Scott, Murphy & Presser, P.C.

(57) ABSTRACT

The present application relates to the technical field of deep learning and pose estimation, and more particularly, to a contextual instance decoupling (CID)-based multi-person pose estimation (MPPE) method and apparatus. The method includes: acquiring a preset number of images containing multiple persons; inputting the images containing multiple persons, as a training sample, into a CID-based MPPE model for training; and performing pose estimation on a target image using the trained CID-based MPPE model, the CID-based MPPE model being provided with an instance information abstraction module, a global feature decoupling module and a heatmap estimation module. The method and apparatus of the present application can explore context clues over a greater range, thus being robust to spatial detection errors and superior in both accuracy and efficiency.

13 Claims, 4 Drawing Sheets

CONTEXTUAL INSTANCE DECOUPLING-BASED MULTI-PERSON POSE ESTIMATION METHOD AND APPARATUS

FIELD

The present application relates to the technical field of deep learning and pose estimation, and more particularly, to a contextual instance decoupling (CID)-based multi-person pose estimation (MPPE) method and apparatus.

BACKGROUND

An MPPE technology is a technology of detecting all persons in an image and locating keypoints for each person. As an important step of human activity understanding, human-computer interaction, human syntactic analysis, etc., MPPE has attracted more and more attention.

The commonly used MPPE approaches include a top-down estimation approach, a bottom-up estimation approach and a single-stage regression approach. However, due to the problems such as wrong bounding box clipping, wrong assembly of keypoints, and long-distance regression, these methods cannot be well robust.

SUMMARY

Based on the above-mentioned technical problem, the present invention aims to obtain a multi-person pose in a target image based on CID. That is, pose estimation is performed on the target image using a trained CID-based MPPE model. The CID-based MPPE model is provided with an instance information abstraction module, a global feature decoupling module and a heatmap estimation module.

According to a first aspect of the present invention, a CID-based MPPE method is provided. The method includes:
  acquiring a preset number of images containing multiple persons;
  inputting the images containing multiple persons, as a training sample, into a CID-based MPPE model for training; and
  performing pose estimation on a target image using the trained CID-based MPPE model.

The CID-based MPPE model is provided with an instance information abstraction module, a global feature decoupling module and a heatmap estimation module.

In some embodiments of the present invention, the CID-based MPPE model further includes a backbone network. The performing pose estimation on a target image using the trained CID-based MPPE model includes:
  inputting the target image into the backbone network to obtain a global feature map, the target image including multiple persons and the global feature map containing three-dimensional features of all the persons;
  inputting the global feature map into the instance information abstraction module and the global feature decoupling module respectively;
  obtaining an instance feature of each person in the target image through the instance information abstraction module;
  inputting the instance feature of each person into the global feature decoupling module, and decoupling, by the global feature decoupling module, an instance feature perception map based on the global feature map and the instance feature of each person; and
  inputting the instance feature perception map into the heatmap estimation module to obtain a probability distribution of each keypoint of each person in the target image.

In some embodiments of the present invention, the obtaining an instance feature of each person in the target image through the instance information abstraction module includes:
  inputting the global feature map into a heatmap module;
  extracting center point coordinates of each person; and
  performing sampling according to corresponding locations of center point coordinates of each person in the global feature map to obtain the instance feature of each person in the target image.

In some embodiments of the present invention, before the obtaining an instance feature of each person in the target image, the method further includes: recalibrating a center point feature of each person based on a spatial attention or a channel attention.

In some embodiments of the present invention, the decoupling, by the global feature decoupling module, an instance feature perception map based on the global feature map and the instance feature of each person includes:
  recalibrating the instance feature of each person from a spatial dimension based on a mapping relationship between the instance feature of each person and the global feature map to obtain a first instance feature perception map;
  recalibrating the instance feature of each person from a channel dimension based on a mapping relationship between the instance feature of each person and the global feature map to obtain a second instance feature perception map; and
  fusing the first instance feature perception map and the second instance feature perception map to obtain the instance feature perception map.

In some embodiments of the present invention, the recalibrating the instance feature of each person from a spatial dimension based on a mapping relationship between the instance feature of each person and the global feature map to obtain a first instance feature perception map includes:
  generating a spatial mask for each person in the global feature map to represent a weight of a foreground feature of each person; and
  increasing the weight of the foreground feature, and recalibrating a spatial location in the instance feature of each person to obtain the first instance feature perception map.

In some embodiments of the present invention, the recalibrating the instance feature of each person from a channel dimension based on a mapping relationship between the instance feature of each person and the global feature map to obtain a second instance feature perception map includes: re-weighting the global feature map over the channel dimension based on person features to generate the second instance feature perception map.

In some embodiments of the present invention, the fusing the first instance feature perception map and the second instance feature perception map to obtain the instance feature perception map includes: performing a weighted sum on the first instance feature perception map and the second instance feature perception map to obtain the instance feature perception map.

In some embodiments of the present invention, the inputting the instance feature perception map into the heatmap estimation module to obtain a probability distribution of each keypoint of each person in the target image includes:

inputting the instance feature perception map into the heatmap estimation module to obtain a heatmap corresponding to each person in the target image, the heatmap corresponding to each person in the target image containing a probability distribution of each keypoint.

In other embodiments of the present invention, the training in the CID-based MPPE model includes training the CID-based MPPE model through a preset loss function:

$$\mathcal{L} = \mathcal{L}_{IIA} + \lambda \mathcal{L}_{GFD}$$

where $\mathcal{L}_{IIA}$ represents a loss of the instance information abstraction module, $\mathcal{L}_{GFD}$ represents a loss of the global feature decoupling module, and $\lambda$ represents a weight.

According to a second aspect of the present invention, a CID-based MPPE apparatus is provided. The apparatus includes:

an acquisition module, configured to acquire a preset number of images containing multiple persons;

a training module, configured to input the images containing multiple persons, as a training sample, into a CID-based MPPE model for training; and a pose estimation module, configured to perform pose estimation on a target image using the trained CID-based MPPE model.

The CID-based MPPE model is provided with an instance information abstraction module, a global feature decoupling module and a heatmap estimation module.

According to a third aspect of the present invention, a computer-readable storage medium having a computer program stored thereon is provided. The computer program, when executed by a processor, implements the following steps:

acquiring a preset number of images containing multiple persons;

inputting the images containing multiple persons, as a training sample, into a CID-based MPPE model for training; and performing pose estimation on a target image using the trained CID-based MPPE model.

The CID-based MPPE model is provided with an instance information abstraction module, a global feature decoupling module and a heatmap estimation module.

According to a fourth aspect of the present invention, a computer program product including a computer program is provided. The computer program, when executed by a processor, implements the following steps:

acquiring a preset number of images containing multiple persons;

inputting the images containing multiple persons, as a training sample, into a CID-based MPPE model for training; and performing pose estimation on a target image using the trained CID-based MPPE model.

The CID-based MPPE model is provided with an instance information abstraction module, a global feature decoupling module and a heatmap estimation module.

The technical solutions provided in the embodiments of the present application have at least the following technical effects or advantages:

According to the technical solutions provided in the embodiments of the present application, pose estimation is performed on a target image using a trained CID-based MPPE model. The CID-based MPPE model is provided with a backbone network, an instance information abstraction module, a global feature decoupling module, and a heatmap estimation module. The target image including multiple persons is input into the backbone network to obtain a global feature map. The global feature map contains three-dimensional features of all the persons. The global feature map is input into the instance information abstraction module and the global feature decoupling module respectively. An instance feature of each person in the target image is obtained through the instance information abstraction module. The instance feature of each person is input into the global feature decoupling module, and the global feature decoupling module decouples an instance feature perception map based on the global feature map and the instance feature of each person. The instance feature perception map is input into the heatmap estimation module to obtain a probability distribution of each keypoint of each person in the target image. Context clues can be explored over a greater range, thus being robust to spatial detection errors, alleviating the challenge of keypoint grouping, and also avoiding the difficulties of long-range regression faced by a single-stage regression method. Experiments show that the technical solutions provided in the embodiments of the present application are superior to other estimation approaches in terms of efficiency and accuracy.

It will be appreciated that both the foregoing general description and the following detailed description are exemplary and explanatory only and are not restrictive of the present invention.

BRIEF DESCRIPTION OF DRAWINGS

Various other advantages and benefits will become apparent to those ordinarily skilled in the art upon reading the following detailed description of the preferred implementations. The drawings are only for purposes of illustrating the preferred implementations and are not to be construed as limiting the present application. Also throughout the drawings, the same reference numerals represent the same components. In the drawings.

DETAILED DESCRIPTION OF EMBODIMENTS

Figure 1:
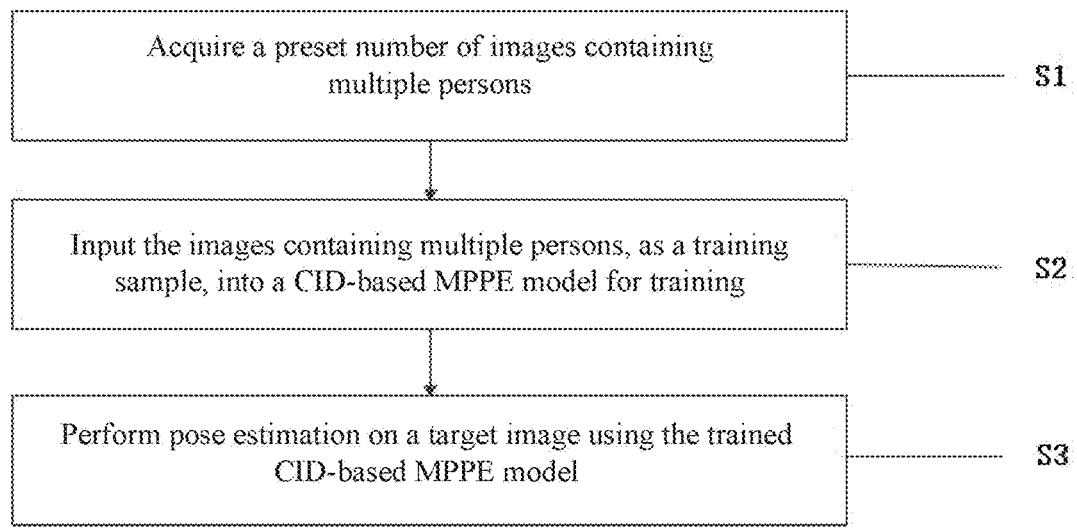
FIG. 1 shows a schematic step diagram of a CID-based MPPE method according to an exemplary embodiment of the present application.

The embodiments of the present application will be described below with reference to the accompanying drawings. It will be appreciated, however, that these descriptions are only by way of example and not as a limitation on the scope of the present application. Furthermore, in the following description, descriptions of well-known structures and technologies are omitted so as to not unnecessarily obscure the concepts of the present application. It will be apparent to those skilled in the art that the present application may be practiced without one or more of these specific details. In other examples, some well-known features in the art have not been described in detail in order to avoid obscuring the present application.

It should be noted that the terms used herein are for the purpose of describing specific embodiments only and are not intended to be limiting of the exemplary embodiments according to the present application. As used herein, the singular forms are intended to include the plural forms as well, unless the context clearly indicates otherwise. Furthermore, it will be further appreciated that the terms "contain" and/or "include", when used in this description, specify the presence of the features, integers, steps, operations, elements, and/or components, but do not preclude the presence or addition of one or more other features, integers, steps, operations, elements, components, and/or combinations thereof.

Exemplary embodiments according to the present application will be now described in more detail with reference to the accompanying drawings. These exemplary embodiments may, however, be implemented in many different forms and should not be construed as being limited to the embodiments set forth herein. The drawings are not necessarily to scale, wherein some details may be magnified and some details may be omitted for clarity. The shapes of various regions and layers, and the relative sizes and location relationships therebetween shown in the figures are only exemplary, and in practice may vary due to manufacturing tolerances or technical limitations, and those skilled in the art may additionally design regions/layers having different shapes, sizes and relative locations as may be desired in practice.

Exemplary implementations according to the present application will be described below by providing several embodiments in conjunction with FIGS. 1-10. It should be noted that the following application scenarios are shown only to facilitate understanding of the spirit and principles of the present application, and the implementations of the present application are not limited in this respect. Rather, the implementations of the present application may be applied to any scenario where applicable.

At present, the commonly used MPPE approaches include a top-down estimation approach, a bottom-up estimation approach and a single-stage regression approach. However, since the top-down estimation approach has wrong bounding box clipping, the bottom-up estimation approach has wrong assembly of keypoints, and the single-stage regression approach has long-distance regression, these methods cannot be well robust and real-time. Considering that accurate and efficient MPPE is an important technology of realizing the intelligent collection and perception of human information in a huge number of videos, MPPE is also an important technical problem in a digital retinal architecture.

Therefore, in some exemplary embodiments of the present application, a CID-based MPPE method oriented towards the digital retinal architecture is provided. As shown in FIG. 1, the method includes: S1, acquiring a preset number of images containing multiple persons; S2, inputting the images containing multiple persons, as a training sample, into a CID-based MPPE model for training; and S3, performing pose estimation on a target image using the trained CID-based MPPE model. The CID-based MPPE model is provided with an instance information abstraction module, a global feature decoupling module and a heatmap estimation module. The CID-based MPPE method may be applied to intelligent collection and perception of human information in the digital retina architecture, which is superior to the top-down estimation approach, the bottom-up estimation approach and the single-stage regression approach. Since these approaches cannot be well robust and real-time, the requirements of the current smart city and digital retina technology are not satisfied.

Figure 2:
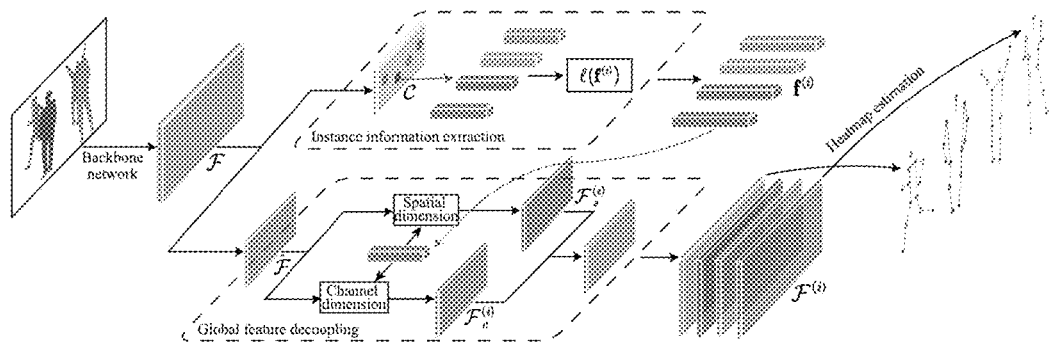
FIG. 2 shows a schematic working process diagram of a CID-based MPPE method according to an exemplary embodiment of the present application.

FIG. 2 illustrates a working process of this method. As shown in FIG. 2, the CID-based MPPE model includes a backbone network, an instance information abstraction module, a global feature decoupling module, and a heatmap estimation module. The instance information abstraction module and the heatmap estimation module are both encapsulated with a heatmap module. For example, an image containing multiple persons is input. After being input into the CID-based MPPE model, the image successively passes through the backbone network, the instance information abstraction module, the global feature decoupling module, and the heatmap estimation module, and a heatmap is finally output, i.e. a probability distribution of each keypoint of each person in the target image, i.e. an estimation result of the input image.

In a specific implementation, the CID-based MPPE model further includes a backbone network. The performing pose estimation on a target image using the trained CID-based MPPE model includes: inputting the target image into the backbone network to obtain a global feature map, the target image including multiple persons and the global feature map containing three-dimensional features of all the persons; inputting the global feature map into the instance information abstraction module and the global feature decoupling module respectively; obtaining an instance feature of each person in the target image through the instance information abstraction module; inputting the instance feature of each person into the global feature decoupling module, and decoupling, by the global feature decoupling module, an instance feature perception map based on the global feature map and the instance feature of each person; and inputting the instance feature perception map into the heatmap estimation module to obtain a probability distribution of each keypoint of each person in the target image.

It can be seen that the object of the estimation method of the present application is to estimate the location of a posture keypoint of each person in the target image, which may be represented by Formula (1):

$$\{K_j^{(i)}\}_{j=1,\ldots,n}^{i=1,\ldots,m} = \mathrm{MPPE}(\mathcal{I}) \qquad (1)$$

where MPPE represents multi-person pose estimation, I represents a target image, $\{K_j^{(i)}\}$ represents a $j^{th}$ posture keypoint of an $i^{th}$ person in the target image, and m and n respectively represent the total number of persons in the target image and the number of keypoints possessed by each person. For example, n is equal to 17 in the COCO pose estimation, and n is equal to 14 in the CrowdPose approach.

In the present application, the instance information abstraction module and the heatmap estimation module are both provided with a heatmap module, in order to use the heatmap module to locate keypoints and finally convert the decoupled global feature map into a heatmap for indicating a probability distribution map of each keypoint, so as to obtain a pose estimation result. The working method of the heatmap module may be represented by Formula (2):

$$\{\mathcal{H}_j\}_{j=1}^n \mathcal{F}^{HM}(\mathcal{F}), \mathcal{F} = \Phi(\mathcal{I}) \quad (2)$$

where HM represents a heatmap module, I represents a target image, F represents a global feature map obtained by processing the target image through the backbone network, and $\{\mathcal{H}_j\}_{j=1}^n$ represents an n-channel heatmap. If it is desired to perform reverse coding using the result obtained in Formula (2), it may be represented by Formula (3):

$$\{K_j^{(i)}\}_{i=1}^m = \text{rank}(\mathcal{H}_j, m) \quad (3)$$

Figure 3:
FIG. 3 shows a schematic diagram of a center point of each person in an extracted target image according to an exemplary embodiment of the present application.

CID proposed by the present application is to decouple a multi-person feature map into a group of instance perception feature maps. Each map represents clues of a particular person and preserves context clues to infer his/her keypoints. In a specific implementation, the obtaining an instance feature of each person in the target image through the instance information abstraction module includes: inputting the global feature map into a heatmap module; extracting center point coordinates of each person; and performing sampling according to corresponding locations of center point coordinates of each person in the global feature map to obtain the instance feature of each person in the target image. It will definitely be appreciated that before obtaining an instance perception feature map of each person in the target image, the method further includes: recalibrating a center point feature of each person based on a spatial attention or a channel attention. A center point feature of each person is extracted as shown in FIG. 3. The working process of this implementation or the working process of the instance information abstraction module may be represented by Formula (4):

$$\{f^{(i)}, I^{(i)}\}_{i=1}^m = IIA(\mathcal{F}) \quad (4)$$

where $f^{(i)}$ represents an instance perception feature of an $i^{th}$ person in the target image and is a one-dimensional feature, and the global feature map contains three-dimensional features of all persons, which may be represented as H*W*C. Then the size of the one-dimensional feature is C, and the purpose here is to effectively separate instances while retaining rich context clues to subsequently estimate locations of keypoints. IIA represents an instance information abstraction module, and F represents a global feature map.

In a specific implementation, the decoupling, by the global feature decoupling module, an instance feature perception map based on the global feature map and the instance feature of each person includes: recalibrating the instance feature of each person from a spatial dimension based on a mapping relationship between the instance feature of each person and the global feature map to obtain a first instance feature perception map; recalibrating the instance feature of each person from a channel dimension based on a mapping relationship between the instance feature of each person and the global feature map to obtain a second instance feature perception map; and fusing the first instance feature perception map and the second instance feature perception map to obtain the instance feature perception map. The recalibrating the instance feature of each person from a spatial dimension based on a mapping relationship between the instance feature of each person and the global feature map to obtain a first instance feature perception map includes: generating a spatial mask for each person in the global feature map to represent a weight of a foreground feature of each person; and increasing the weight of the foreground feature, and recalibrating a spatial location in the instance feature of each person to obtain the first instance feature perception map. The recalibrating the instance feature of each person from a channel dimension based on a mapping relationship between the instance feature of each person and the global feature map to obtain a second instance feature perception map includes: re-weighting the global feature map over the channel dimension based on person features to generate the second instance feature perception map. The fusing the first instance feature perception map and the second instance feature perception map to obtain the instance feature perception map includes: performing a weighted sum on the first instance feature perception map and the second instance feature perception map to obtain the instance feature perception map. The working process of this implementation or the working process of the global feature decoupling module may be represented by Formula (5):

$$\{\mathcal{F}^{(i)}\}_{i=1}^m = GFD(\mathcal{F}, \{f^{(i)}, I^{(i)}\}_{i=1}^m) \quad (5)$$

It should be further noted that the training in the CID-based MPPE model includes training the CID-based MPPE model through a preset loss function. The preset loss function is represented by Formula (6):

$$\mathcal{L} = \mathcal{L}_{IIA} + \lambda \mathcal{L}_{GFD} \quad (6)$$

where $\mathcal{L}_{IIA}$ represents a loss of the instance information abstraction module, $\mathcal{L}_{GFD}$ represents a loss of the global feature decoupling module, and $\lambda$ represents a weight.

It should be noted that the regression method generates keypoint coordinates based on a feature of a person center point. In the present application, the center point is also selected as a keypoint. That is to say, the person center point is located by the heatmap module, and the model outputs a heatmap finally, so as to obtain the probability distribution of each keypoint of each person in the target image. The person center point is located by the heatmap module, which may be represented by Formula (7):

$$C = HM_{center}(\mathcal{F}) \quad (7)$$

where C represents a heatmap corresponding to a center point. As shown in FIG. 2, the heatmap is also referred to as a heat map, indicating that each pixel is the center of a person. C may be input into Formula (2) to perform inverse coding locating, i.e. determining a center point location. The center point feature of each person is relabeled as a representative feature on the global feature, which may be represented by Formula (8):

$$f^{(i)} = \mathcal{F}(I^{(i)}) \quad (8)$$

It should be explained that in practical applications of the pose estimation method, it is expected to have a strong discriminative ability to effectively distinguish visually similar persons. In other words, if two adjacent or overlapping persons have a similar appearance, they may have similar features, leading to cases where decoupling of persons fails. In order to enhance the discrimination of person features, the present application performs contrastive loss training on IIA in a preferred training manner, so as to ensure the resolution of each $f^{(i)}$. A group of person features $\{f(i)\}$ are given, wherein an $i^{th}$ person feature is constrained by minimizing the similarity of the $i^{th}$ person feature to other features, and may be represented by Formula (9):

$$\ell(f^{(i)}) = -\log \frac{\exp(\overline{f}^{(i)} \cdot \overline{f}^{(i)}/\tau)}{\sum_{j=1}^m \exp(\overline{f}^{(i)} \cdot \overline{f}^{(j)}/\tau)} \quad (9)$$

where $\bar{f}^{(i)}$ represents a normalized feature of an $i^{th}$ person, and τ represents a temperature coefficient which is preferably set to 0.05.

In some embodiments of the present application, a spatial mask is generated for each person in the global feature map to represent a weight of a foreground feature of each person. The weight of the foreground feature is increased, and a spatial location in the global feature map is recalibrated to obtain the first instance feature perception map, which may be represented by Formula (10):

$$\mathcal{F}_a^{(i)} = \mathcal{M}^{(i)} \cdot \hat{\mathcal{F}} \qquad (10)$$

where M represents a spatial mask, which may also be referred to as a foreground mask, and $\hat{\mathcal{F}}$ represents an instance perception feature map. The spatial mask is generated in consideration of a spatial location $I^{(i)}(x_i, y_i)$ of an $i^{th}$ person in an image, a relative covariance map is generated, and then an inner product of an instance feature and a feature at each spatial location is calculated. The generation of the spatial mask results in a map indicating pixel-level feature similarity, which may be represented by Formula (11):

$$\mathcal{M}^{(i)} = \text{Sigmoid}(\text{Conv}([\mathcal{O}^{(i)}; \mathcal{M}_{sim}^{(i)}])) \qquad (11)$$

where $\mathcal{O}^{(i)}$ and $\mathcal{M}_{sim}^{(i)}$ are used for indicating the similarity of pixel-level features, and Sigmoid represents an activation function. The experiments show that the discrimination of the person features is enhanced by increasing the weight of the foreground feature, thus being more robust to occlusion and interference from adjacent persons with the similar appearance. The instance perception feature map may pay more attention to the foreground of each person and ensure the generation of a reliable keypoint heatmap.

Channels play an important role in the encoding context, and each channel may be re-encoded as a feature detector. Therefore, in a specific implementation, decoupling different channels includes: re-weighting the global feature map over the channel dimension based on person features, and generating the second instance feature perception map, which may be represented by Formula (12):

$$\mathcal{F}_c^{(i)} = \hat{\mathcal{F}} \otimes f^{(i)} \qquad (12)$$

where $\mathcal{F}_c^{(i)}$ represents a recalibration result, ⊗ represents a product, and $f^{(i)}$ may be regarded as a person feature of a retained clue of the $i^{th}$ person. The formula will not decouple one person into a particular channel of a feature map, but will ensure that different persons show different channel distributions. Definitely, in order to achieve better results, the ability to decouple the channels may be further trained according to Formula (9), thereby further enhancing the performance of channel recalibration while retaining contextual instances.

The fusion of the different spatial locations and channels to obtain a global feature map may be represented by Formula (13):

$$\mathcal{F}^{(i)} = \text{ReLU}(\text{Conv}([\mathcal{F}_c^{(i)}; \mathcal{F}_s^{(i)}])) \qquad (13)$$

where ReLU represents an activation function, and Conv represents convolution.

Figure 4:
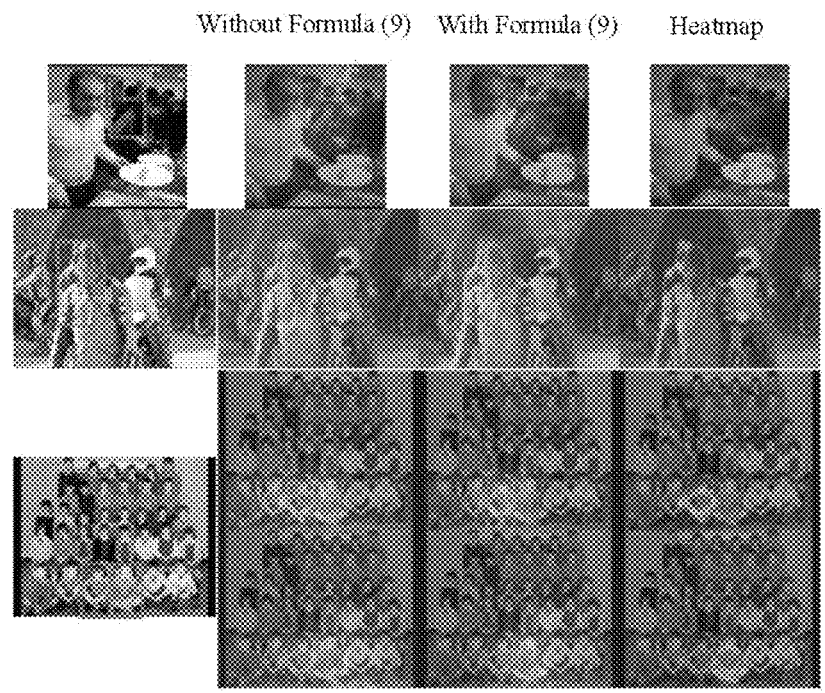
FIG. 4 shows a schematic diagram of an effect obtained by training using a loss function of Formula (9) according to an exemplary embodiment of the present application.
Figure 5:
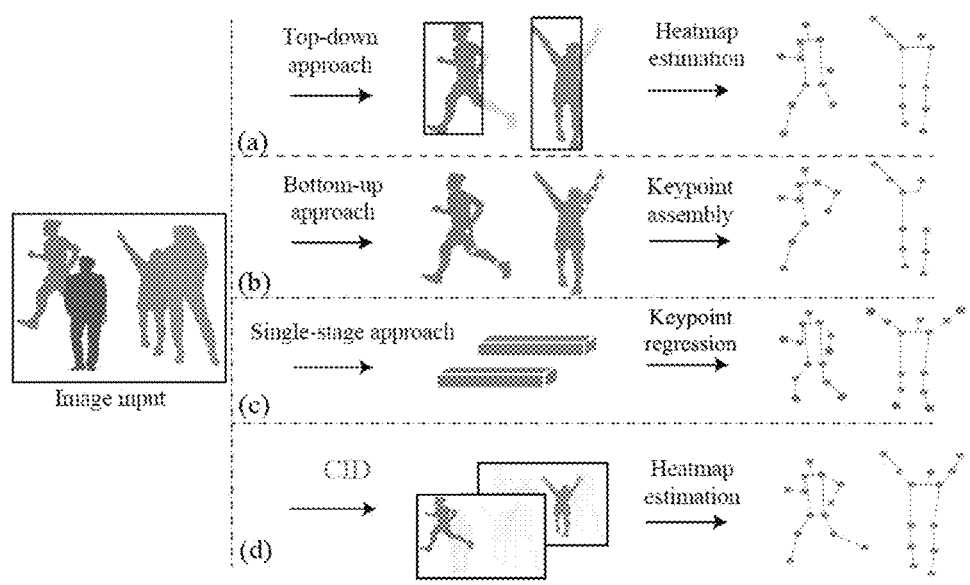
FIG. 5 shows a schematic diagram comparing the method of the present application with other estimation approaches.

FIG. 4 illustrates a better result obtained by training a model using a loss function of Formula (9) and then identifying a target image. The end-to-end training characteristics and the robustness to detection errors of the present application show better performance and efficiency than the bottom-up approach which relies on keypoint grouping. FIG. 5 also illustrates a comparison of several different pose estimation approaches. As shown in FIG. 5, (a) is a top-down estimation approach for detecting human bounding boxes and performing pose estimation on each bounding box, (b) is a bottom-up estimation approach for detecting body keypoints and then dividing the body keypoints into corresponding persons, and (c) is a single-stage regression approach, which regresses keypoint coordinates of a posture according to human features. It is obvious that the estimation method of the present application is strongly robust to occlusions, and compared with the top-down and bottom-up estimation approaches, the method has end-to-end trainability, is more robust to detection errors, and alleviates the challenge of keypoint grouping. The long-distance regression difficulties faced by the single-stage regression approach are also avoided. Experiments show that the CID-based MPPE method proposed in the present application are superior to other estimation approaches in terms of efficiency and accuracy.

In some embodiments of the present application, in order to achieve a better training result, a ground real heatmap is also employed in training the CID-based MPPE model. When the preset loss function described in Formula (6) is used for specific training, a Gaussian heatmap generated using real coordinates may be used for accurately locating keypoints, and the specific process may be represented by Formulas (14) to (17):

$$\mathcal{H}_j^*(x, y) = \exp\left(-\frac{(x-x_j)^2 + (y-x_j)^2}{2\sigma_i^2}\right) \qquad (14)$$

$$\mathcal{L}_{HA} = FL([\mathcal{H}; C], [\mathcal{H}^*; C^*]) + \frac{1}{m}\sum_{i=1}^{m} \ell(f^{(i)}). \qquad (15)$$

$$FL(\mathcal{H}, \mathcal{H}^*) = \frac{-1}{N}\sum_{xy}\begin{cases}(1-\mathcal{H}_{x,y})^\alpha \log(\mathcal{H}_{x,y}) & \text{if } \mathcal{H}_{x,y}^* = 1 \\ (1-\mathcal{H}_{x,y}^*)^\beta (\mathcal{H}_{x,y})^\alpha \\ \log(1-\mathcal{H}_{x,y}) & \text{otherwise}\end{cases} \qquad (16)$$

$$\mathcal{L}_{GFD} = \frac{1}{m}\sum_{i=1}^{m} FL(\mathcal{H}^{(i)}, \mathcal{H}^{(i)*}) \qquad (17)$$

where $\mathcal{H}_j^*$ represents a ground real heatmap, x, $y_j$ represent spatial coordinates of a keypoint, α and β represent hyperparameters, α is preferred to be 2, and β is preferred to be 4. By means of these formulas, the difference between the heatmap corresponding to each person and the ground truth is measured so as to continuously adjust the individual parameters.

The following is a brief description of the experiments carried out in the present application in order to evaluate the method proposed in the present application using the widely used MPPE benchmark herein. All experiments were carried out on Pytorh, HRNet-W32 was used herein as a backbone network for all the experiments, and most configurations of the above-mentioned CID-based MPPE model were followed. m was set to 30 in IIA, and λ in Formula (6) was set to 4. During the training process, each image was resized to 512*512, and the learning rate of all layers was set to 0.001. A model of 35 periods was trained on COCO. A model of 300 stages was trained for CrowdPose, and the learning rate was divided by 10 at stages 200 and 260. The batch size was set to 20, and Ohuman, CrowdPose and COCO were set to 40. Table 1 illustrates a contrast of spatial and channel recalibration. As shown in Table 1, Spatial represents spatial, and Chennel represents channel. This loss facilitates channel recalibration, and improves the performance from 64.9% to 65.3%. The contrastive loss of the spatial recalibration reaches 64.6%, which indicates that the recalibration method can effectively separate persons. The fusion of channel and spatial recalibration always achieves optimal performance with and without the contrastive loss. It is concluded that learning discriminative persons and jointly considering spatial and channel decoupling is very important for decoupling "person" in a target image.

TABLE 1

Contrast of Spatial and Channel Recalibration

| $\ell$ ($f^{(i)}$) | Spatial dimension | Channel dimension | AP | $AP^{50}$ | $AP^{75}$ | $AP^E$ | $AP^L$ |
|---|---|---|---|---|---|---|---|
| | ✓ | | 17.9 | 29.4 | 16.7 | 11.7 | 26.9 |
| | | ✓ | 64.9 | 86.1 | 71.0 | 58.1 | 74.5 |
| | ✓ | ✓ | 65.3 | 86.4 | 71.4 | 59.3 | 74.8 |
| ✓ | ✓ | | 64.6 | 86.0 | 70.8 | 58.5 | 74.1 |
| ✓ | | ✓ | 65.3 | 85.9 | 71.9 | 59.1 | 75.3 |
| ✓ | ✓ | ✓ | 66.0 | 86.7 | 72.3 | 59.8 | 76.0 |

Furthermore, considering that channel dimensions are too small to encode a large number of human clues and that channel dimensions are so large as to increase storage and computational costs, this implementation tested different embedding dimensions from 8 to 64 and reported their performance, as shown in Table 2. This indicates that a smaller dimension corresponds to a lower performance. If a dimension (e.g. 64) is set to be too large, the performance will not be significantly improved. The embedding dimension was set to 32 as a reasonable balance between accuracy and computational cost.

TABLE 2

Contrast of Different Embedding Dimensions of Channels

| # Channel dimension | AP | $AP^{50}$ | $AP^{75}$ | $AP^M$ | $AP^L$ |
|---|---|---|---|---|---|
| 8 | 62.8 | 85.1 | 68.2 | 56.2 | 72.8 |
| 16 | 64.4 | 86.1 | 70.4 | 58.5 | 74.1 |

TABLE 2-continued

Contrast of Different Embedding Dimensions of Channels

| # Channel dimension | AP | $AP^{50}$ | $AP^{75}$ | $AP^M$ | $AP^L$ |
|---|---|---|---|---|---|
| 32 | 66.0 | 86.7 | 72.3 | 59.8 | 76.0 |
| 64 | 66.1 | 86.8 | 72.6 | 60.0 | 76.0 |

Figure 6:
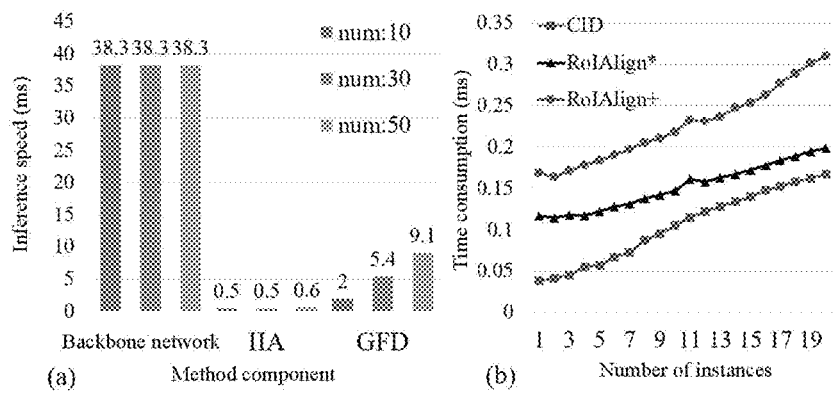
FIG. 6 shows a schematic diagram comparing a CID-based MPPE method with a RoIAlign method in the experiment of the present application.

FIG. 6 shows a comparison of the CID-based MPPE method with RoIAlign in terms of time cost of generating instance features for different numbers of persons from a global feature map. As shown in FIG. 6, RoIAlign[+] outputs a feature map with a size of 14×14, which is then upsampled to 56×56. RoIAlign* directly outputs a feature map with a size of 56×56. It is obvious that the estimation efficiency of the method of the present application is much higher than that of RoIAlign[+] and RoIAlign*.

Furthermore, the memory consumption of several methods is compared as shown in Table 3. In these comparisons, HrHRNeT follows a bottom-up process and DEKR and FCPose are single-stage regression approaches, and therefore HrHRNet is more efficient thereamong. However, the CID method of the present application generally performs better than HrHRNet. Compared with the two single-stage regression approaches, the method herein consumes more memory but achieves higher reasoning speed and better accuracy.

TABLE 3

Contrast of Memory Consumption of Several Approaches

| | Memory (G) | Parameters (M) | Floating point operations | Speed (fps) | Accuracy |
|---|---|---|---|---|---|
| HrHRNet | 3.5 | 29.6 | 48.11 | 4.9 | 66.4 |
| DEKR | 3.6 | 28.6 | 44.50 | 5.4 | 67.3 |
| FCPose | 4.8 | 60.3 | 256.7 | 15.2 | 65.6 |
| CID | 3.8 | 29.4 | 43.17 | 21.0 | 68.9 |

In addition, Tables 4, 5 and 6 also list comparisons of other estimation approaches for various parameters.

TABLE 4

Comparison of the Present Application with COCO

| Contrast approaches | Backbone network | Input size | Inference speed | AP | $AP^{50}$ | $AP^{75}$ | $AP^M$ | $AP^L$ | AR |
|---|---|---|---|---|---|---|---|---|---|
| Top-down approach | | | | | | | | | |
| Mask R-CNN [13] | ResNet-50 + FPN | 800 | 14.2 | 63.1 | 87.3 | 68.7 | 57.8 | 71.4 | — |
| SimpleBaseline* [45] | ResNet-152 | 384 × 288 | — | 73.7 | 91.9 | 81.1 | 70.3 | 80.0 | — |
| HRNet[+] [38] | HRNet-W32 | 384 × 288 | — | 74.9 | 92.5 | 82.8 | 71.3 | 80.9 | — |
| Bottom-up approach | | | | | | | | | |
| OpenPose[+] 2 | VGG-19 | — | 10.1 | 61.8 | 84.9 | 67.5 | 57.1 | 68.2 | 66.5 |
| AE [24] | HourGlass | 512 | 8.1 | 62.8 | 84.6 | 69.2 | 57.5 | 70.6 | — |
| HGG [16] | HourGlass | 512 | — | 60.4 | 83.0 | 66.2 | 84.0 | 69.8 | — |
| PifPaf [18] | ResNet-152 | — | — | 66.7 | — | — | 62.4 | 72.9 | — |
| PersonLab [28] | ResNet-152 | 1401 | 5.0 | 66.5 | 88.0 | 72.6 | 62.4 | 72.3 | 71.0 |
| HrHRNet [4] | HRNet-W32 | 512 | 4.9 | 66.4 | 87.5 | 72.8 | 61.2 | 74.2 | — |
| SWAHR [22] | HrHRNet-W32 | 512 | 4.9 | 67.9 | 88.9 | 74.5 | 62.4 | 75.5 | — |
| CenterAttention [1] | HrHRNet-W32 | 512 | — | 67.6 | 88.7 | 73.6 | 61.9 | 75.6 | — |
| Single-stage regression approach | | | | | | | | | |
| CenterNet [50] | HourGlass | 512 | 12.2 | 63.0 | 86.8 | 69.6 | 58.9 | 70.4 | — |
| SPM[+] [27] | HourGlass | — | — | 66.9 | 88.5 | 72.9 | 62.6 | 73.1 | — |
| PointSet Anchor [44] | HRNet-W48 | 800 | 4.8 | 66.3 | 87.7 | 73.4 | 64.9 | 70.0 | — |

TABLE 4-continued

Comparison of the Present Application with COCO

| Contrast approaches | Backbone network | Input size | Inference speed | AP | $AP^{50}$ | $AP^{75}$ | $AP^M$ | $AP^L$ | AR |
|---|---|---|---|---|---|---|---|---|---|
| FCPose [23] | ResNet-101 + FPN | 800 | 15.2 | 65.6 | 87.9 | 72.6 | 62.1 | 72.3 | — |
| DEKR [11] | HRNet-W32 | 512 | 5.1 | 67.3 | 87.9 | 74.1 | 61.5 | 76.1 | 72.4 |
| Ours | HRNet-W32 | 512 | 21.0 | 68.9 | 89.9 | 76.0 | 63.2 | 77.7 | 74.6 |
| Ours | HRNet-W48 | 640 | 12.5 | 70.7 | 90.3 | 77.9 | 66.3 | 77.8 | 76.4 |

TABLE 5

Comparison of the Present Application with CrowdPose

| Contrast approaches | AP | $AP^{50}$ | $AP^{75}$ | $AP^E$ | $AP^M$ | $AP^H$ |
|---|---|---|---|---|---|---|
| Top-down approach | | | | | | |
| Mask R-CNN [3] | 57.2 | 83.5 | 60.3 | 69.4 | 57.9 | 45.8 |
| JC-SPPE [20] | 66.0 | 84.2 | 71.5 | 75.5 | 66.3 | 57.4 |
| Bottom-up approach | | | | | | |
| OpenPose+ [2] | — | — | — | 62.7 | 48.7 | 32.3 |
| HrHRNet-W48 [4] | 65.9 | 86.4 | 70.6 | 73.3 | 66.5 | 57.9 |
| CenterAttention [1] | 67.6 | 87.7 | 72.7 | 75.8 | 68.1 | 58.9 |
| Single-stage regression approach | | | | | | |
| DEKR(HRNet-W32) [11] | 65.7 | 85.7 | 70.4 | 73.0 | 66.4 | 57.5 |
| DEKR(HRNet-W48) [11] | 67.3 | 86.4 | 72.2 | 74.6 | 68.1 | 58.7 |
| Ours(HRNet-W32) | 71.3 | 90.6 | 76.6 | 77.4 | 72.1 | 63.9 |
| Ours(HRNet-W48) | 72.3 | 90.8 | 77.9 | 78.7 | 73.0 | 64.8 |

TABLE 6

Comparison of the Present Application with OCHuman

| | OCHuman val | COCO train | |
|---|---|---|---|
| Contrast approaches | test | val | test |
| Top-down approach | | | |
| Mask R-CNN [3] | 20.2 | — | — |
| JC-SPPE [20] | 27.6 | — | — |
| OPEC-Net [34] | 29.1 | — | — |
| RMPE [7] | — | 38.8 | 30.7 |
| SimpleBaseline [45] | — | 41.0 | 33.3 |
| Bottom-up approach | | | |
| AE [24] | — | 32.1 | 29.5 |
| HGG [16] | — | 35.6 | 34.8 |
| HrHRNet-W32 [4] | 27.7 | 40.0 | 39.4 |
| Single-stage regression approach | | | |
| SPM [27] | 45.6 | — | — |
| DEKR(HRNet-W32) [11] | 52.2 | 37.9 | 36.5 |
| Ours(HRNet-W32) | 57.5 | 44.9 | 44.0 |
| Ours(HRNet-W48) | 58.6 | 46.1 | 45.0 |

Figure 7:
FIG. 7 shows a schematic diagram comparing three pose estimation approaches: COCO, CrowdPose and OCHuman in the experiment of the present application.

The top-down approach, the bottom-up approach and the single-stage regression approach are shown in Tables 4 to 6. As can be seen from Table 4, CID achieves better performance than the top-down approach, 5.8% higher than Mask R-CNN. This indicates that the decoupling strategy herein is superior to bounding box clipping. CID is also better than many bottom-up approaches. As can be seen from Tables 5 and 6, CID has a greater advantage. In addition, FIG. 7 illustrates a schematic diagram comparing three pose estimation approaches: COCO, CrowdPose and OCHuman. It can be observed that the method of the present application can obtain reliable and accurate pose estimation even in challenging situations, such as severe occlusion and personnel overlap, and can be applied to practical scenario processing in smart cities, such as pedestrian perception and analysis in digital retina technology.

It will be appreciated that both the foregoing general description and the following detailed description are exemplary and explanatory only and are not restrictive of the present invention.

Figure 8:
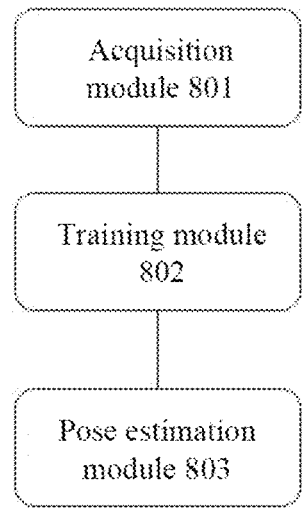
FIG. 8 shows a schematic structural diagram of a CID-based MPPE apparatus according to an exemplary embodiment of the present application.

In some embodiments of the present application, a CID-based MPPE apparatus oriented towards a digital retinal architecture is also provided. As shown in FIG. 8, the apparatus includes:
an acquisition module 801, configured to acquire a preset number of images containing multiple persons;
a training module 802, configured to input the images containing multiple persons, as a training sample, into a CID-based MPPE model for training; and
a pose estimation module 803, configured to perform pose estimation on a target image using the trained CID-based MPPE model.

The CID-based MPPE model is provided with an instance information abstraction module, a global feature decoupling module and a heatmap estimation module. It will be appreciated that the modular arrangement of the apparatus is integrated with existing digital retinal architectures so that the apparatus can be applied to digital retinal architectures for intelligent collection and perception of human information with precise perception results.

It is also emphasized that the system provided in the embodiments of the present application may acquire and process relevant data based on an artificial intelligence (AI) technology. AI is a theory, method, technology and application system that utilizes a digital computer or a machine controlled by a digital computer to simulate, extend and expand human intelligence, perceive the environment, acquire knowledge, and use the knowledge to obtain optimal results. The basic technologies of AI generally include such technologies as sensors, dedicated AI chips, cloud computing, distributed storage, large data processing technologies, operation/interaction systems, and electromechanical integration. An AI software technology mainly includes a computer vision technology, a robot technology, a biological recognition technology, a speech processing technology, a natural language processing technology, and machine learning/deep learning.

Figure 9:
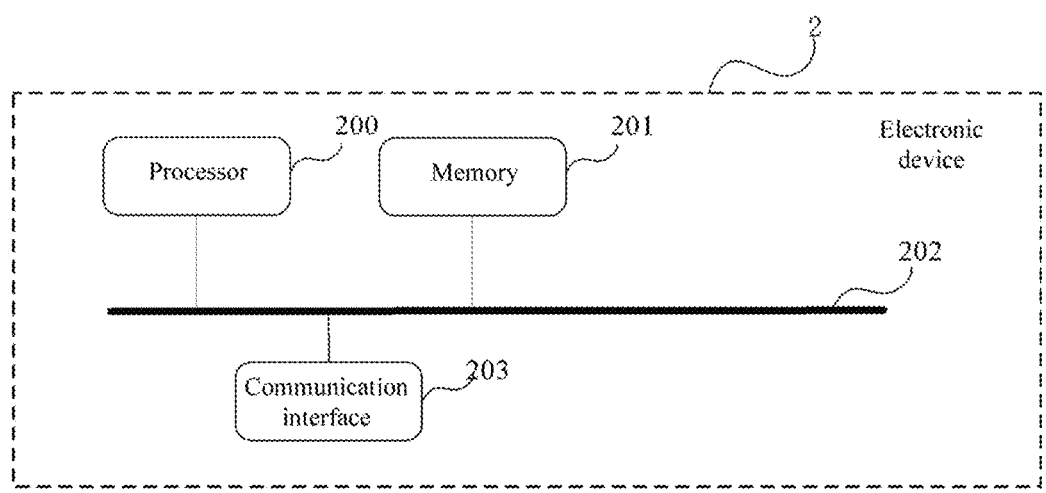
FIG. 9 shows a schematic structural diagram of a computer device according to an exemplary embodiment of the present application.

Reference is now made to FIG. 9, which shows a schematic diagram of a computer device according to some implementations of the present application. As shown in FIG. 9, the computer device 2 includes: a processor 200, a memory 201, a bus 202, and a communication interface 203. The processor 200, the communication interface 203 and the memory 201 are connected through the bus 202. The memory 201 has a computer program executable on the processor 200 stored therein. The computer program, when executed by the processor 200, performs the CID-based MPPE method provided by any of the foregoing implementations of the present application.

The memory 201 may include a high-speed random access memory (RAM), and may also include a non-volatile memory, such as at least one disk memory. The communication connection between the system network element and at least one other network element is realized through at least one communication interface 203 (which may be wired or wireless), and the Internet, a wide area network, a local area network, a metropolitan area network, etc. may be used.

The bus 202 may be an ISA bus, a PCI bus, an EISA bus, or the like. The bus may be divided into an address bus, a data bus, a control bus, etc. The memory 201 is configured to store a program, and the processor 200 executes the program after receiving an execution instruction. The CID-based MPPE method disclosed in any of the implementations of the present application may be applied to the processor 200 or implemented by the processor 200.

The processor 200 may be an integrated circuit chip having signal processing capabilities. During implementation, the steps of the above-mentioned method may be completed by instructions in the form of integrated logic circuits in hardware or software in the processor 200. The above-mentioned processor 200 may be a general-purpose processor, including a central processing unit (CPU), a network processor (NP), etc., and may also be a digital signal processor (DSP), an application specific integrated circuit (ASIC), a field programmable gate array (FPGA) or another programmable logic device, a discrete gate or transistor logic device, or a discrete hardware component. The various methods, steps, and logical block diagrams disclosed in the embodiments of the present application may be implemented or performed. The general-purpose processor may be a microprocessor or the processor may be any conventional processor. The steps of the methods disclosed in connection with the embodiments of the present application may be embodied directly as being completed by a hardware decoding processor, or by the combination of hardware and software modules in a decoding processor. The software module may be located in a RAM, a flash memory, a read-only memory (ROM), a programmable ROM, or an electrically erasable programmable memory, a register, or another storage medium well known in the art. The storage medium is located in the memory 201, and the processor 200 reads information in the memory 201 and, in conjunction with the hardware thereof, completes the steps of the above-mentioned method.

Figure 10:
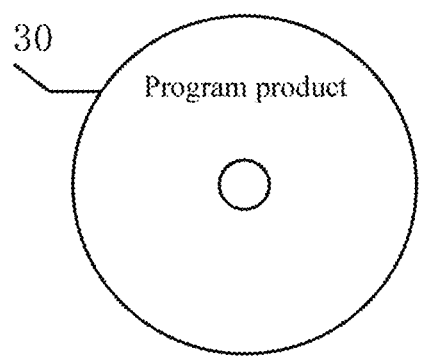
FIG. 10 shows a schematic diagram of a storage medium according to an exemplary embodiment of the present application.

Implementations of the present application also provide a computer-readable storage medium corresponding to the CID-based MPPE method provided by the foregoing implementations. With reference to FIG. 10, the computer-readable storage medium shown in FIG. 10 is an optical disc 30, on which a computer program (i.e. a program product) is stored. The computer program, when executed by a processor, may perform the CID-based MPPE method provided by any of the foregoing implementations.

In addition, examples of the computer-readable storage medium may include, but are not limited to, a phase-change random access memory (PRAM), a static random access memory (SRAM), a dynamic random access memory (DRAM), other types of RAMs, a ROM, an electrically erasable programmable read-only memory (EEPROM), a flash memory, or other optical and magnetic storage media, which will not be described in detail herein.

The computer-readable storage medium provided by the above-mentioned embodiments of the present application and a quantum key distribution channel allocation method in a space division multiplexing optical network provided by the embodiments of the present application are derived from the same inventive concept, and have the same beneficial effects as the method adopted, operated or realized by an application stored therein.

Implementations of the present application also provide a computer program product including a computer program which, when executed by a processor, implements the steps of the CID-based MPPE method provided by any of the foregoing implementations. The method includes: acquiring a preset number of images containing multiple persons; inputting the images containing multiple persons, as a training sample, into a CID-based MPPE model for training; and performing pose estimation on a target image using the trained CID-based MPPE model, the CID-based MPPE model being provided with an instance information abstraction module, a global feature decoupling module and a heatmap estimation module.

It should be noted that the algorithms and displays provided herein are not inherently related to any particular computer, virtual apparatus, or other devices. Various general-purpose apparatuses may also be used with the teachings based herein. The structure required to construct such apparatuses is apparent from the above description. Furthermore, the present application is not directed to any particular programming language. It should be understood that the present application described herein may be implemented using a variety of programming languages, and that the above description of specific languages is intended to disclose the best implementation of the present application. In the description provided herein, numerous specific details are set forth. However, it will be appreciated that the embodiments of the present application may be practiced without these specific details. In some instances, well-known methods, structures and technologies have not been shown in detail in order not to obscure the understanding of this description.

Similarly, it should be appreciated that in the above description of exemplary embodiments of the present application, various features of the present application are sometimes grouped together in a single embodiment, figure, or description thereof for the purpose of simplifying the present application and aiding in the understanding of one or more of the various inventive aspects. However, the disclosed methods are not to be interpreted as reflecting an intention that the claimed application claims more features than expressly recited in each claim. Rather, as the following claims reflect, the inventive aspects lie in less than all features of a single embodiment described above. Therefore, the claims following a specific implementation are hereby expressly incorporated into this specific implementation, wherein each claim serves as a separate embodiment of the present application.

Those skilled in the art will appreciate that the modules in the device in an embodiment may be adaptively changed and arranged in one or more devices other than the embodiment. Modules or units or components in the embodiment may be combined into one module or unit or component, and may furthermore be divided into multiple sub-modules or sub-units or sub-components. All of the features disclosed in this description, and all of the processes or units of any method or device so disclosed, may be combined in any combination, except combinations where at least some of such features and/or processes or units are mutually exclusive. Each feature disclosed in this description may be replaced by an alternative feature providing the same, equivalent or similar purpose, unless expressly stated otherwise.

Various component embodiments of the present application may be implemented in hardware, or in software modules operated on one or more processors, or in combinations thereof. Those skilled in the art will appreciate that a microprocessor or DSP may be used in practice to implement some or all of the functions of some or all of the components of a creation apparatus of a virtual machine according to the embodiments of the present application. The present application may also be implemented as a device or apparatus program for performing a portion or all of the methods described herein. The program implementing the present application may be stored on the computer-readable medium or may be in the form of one or more signals. Such signals may be downloaded from an Internet website, or provided on a carrier signal, or provided in any other form.

The above descriptions are only preferred specific implementations of the present application, but the scope of protection of the present application is not limited thereto. Any changes or substitutions which may be easily conceived by those skilled in the art within the technical scope disclosed in the present application should be covered by the scope of protection of the present application. Therefore, the scope of protection of the present application should be subject to the scope of protection of the claims.

The invention claimed is:

1. A contextual instance decoupling (CID)-based multi-person pose estimation (MPPE) method, comprising:
acquiring a preset number of images containing multiple persons;
inputting the images containing multiple persons, as a training sample, into a CID-based MPPE model for training; and
performing pose estimation on a target image using the trained CID-based MPPE model,
the CID-based MPPE model being provided with an instance information abstraction module, a global feature decoupling module and a heatmap estimation module.

2. The CID-based MPPE method according to claim 1, wherein the CID-based MPPE model further comprises a backbone network, and the performing pose estimation on a target image using the trained CID-based MPPE model comprises:
inputting the target image into the backbone network to obtain a global feature map, the target image comprising multiple persons and the global feature map containing three-dimensional features of all the persons;
inputting the global feature map into the instance information abstraction module and the global feature decoupling module respectively;
obtaining an instance feature of each person in the target image through the instance information abstraction module;
inputting the instance feature of each person into the global feature decoupling module, and decoupling, by the global feature decoupling module, an instance feature perception map based on the global feature map and the instance feature of each person; and
inputting the instance feature perception map into the heatmap estimation module to obtain a probability distribution of each keypoint of each person in the target image.

3. The CID-based MPPE method according to claim 2, wherein the obtaining an instance feature of each person in the target image through the instance information abstraction module comprises:
inputting the global feature map into a heatmap module;
extracting center point coordinates of each person; and
performing sampling according to corresponding locations of center point coordinates of each person in the global feature map to obtain the instance feature of each person in the target image.

4. The CID-based MPPE method according to claim 3, wherein before the obtaining an instance feature of each person in the target image, the method further comprises:
recalibrating a center point feature of each person based on a spatial attention or a channel attention.

5. The CID-based MPPE method according to claim 2, wherein the decoupling, by the global feature decoupling module, an instance feature perception map based on the global feature map and the instance feature of each person comprises:
recalibrating the instance feature of each person from a spatial dimension based on a mapping relationship between the instance feature of each person and the global feature map to obtain a first instance feature perception map;
recalibrating the instance feature of each person from a channel dimension based on a mapping relationship between the instance feature of each person and the global feature map to obtain a second instance feature perception map; and
fusing the first instance feature perception map and the second instance feature perception map to obtain the instance feature perception map.

6. The CID-based MPPE method according to claim 5, wherein the recalibrating the instance feature of each person from a spatial dimension based on a mapping relationship between the instance feature of each person and the global feature map to obtain a first instance feature perception map comprises:
generating a spatial mask for each person in the global feature map to represent a weight of a foreground feature of each person; and
increasing the weight of the foreground feature, and recalibrating a spatial location in the instance feature of each person to obtain the first instance feature perception map.

7. The CID-based MPPE method according to claim 6, wherein decoupling different channels comprises: re-weighting the global feature map over the channel dimension based on person features to generate the second instance feature perception map.

8. The CID-based MPPE method according to claim 7, wherein the fusing the first instance feature perception map and the second instance feature perception map to obtain the instance feature perception map comprises: performing a weighted sum on the first instance feature perception map and the second instance feature perception map to obtain the instance feature perception map.

9. The CID-based MPPE method according to claim 2, wherein the inputting the instance feature perception map into the heatmap estimation module to obtain a probability distribution of each keypoint of each person in the target image comprises:
inputting the instance feature perception map into the heatmap estimation module to obtain a heatmap corresponding to each person in the target image,
the heatmap corresponding to each person in the target image containing a probability distribution of each keypoint.

10. The CID-based MPPE method according to claim 1, wherein the training in the CID-based MPPE model comprises training the CID-based MPPE model through a preset loss function:

$$\mathcal{L} = \mathcal{L}_{IIA} + \lambda \mathcal{L}_{GFD}$$

where $\mathcal{L}_{IIA}$ represents a loss of the instance information abstraction module, $\mathcal{L}_{GFD}$ represents a loss of the global feature decoupling module, and $\lambda$ represents a weight.

11. A computer-readable storage medium having a computer program stored thereon, wherein the computer program, when executed by a processor, implements the steps of the method according to claim 1.

12. A computer program product, comprising a computer program which, when executed by a processor, implements the steps of the method according to claim 1.

13. A contextual instance decoupling (CID)-based multi-person pose estimation (MPPE) apparatus, comprising:
an acquisition module, configured to acquire a preset number of images containing multiple persons;
a training module, configured to input the images containing multiple persons, as a training sample, into a CID-based MPPE model for training; and
a pose estimation module, configured to perform pose estimation on a target image using the trained CID-based MPPE model,
the CID-based MPPE model being provided with an instance information abstraction module, a global feature decoupling module and a heatmap estimation module.

* * * * *